United States Patent [19]

Gehman et al.

[11] 4,150,005
[45] Apr. 17, 1979

[54] INTERNALLY PLASTICIZED POLYMER LATEX

[75] Inventors: David R. Gehman, Harleysville; Joseph M. Owens, Hatboro; Richard E. Zdanowski, Fort Washington, all of Pa.

[73] Assignee: Rohm and Haas Company, Philadelphia, Pa.

[21] Appl. No.: 876,285

[22] Filed: Feb. 9, 1978

Related U.S. Application Data

[63] Continuation-in-part of Ser. No. 778,819, Mar. 17, 1977, abandoned.

[51] Int. Cl.² ............................................. C08L 91/00
[52] U.S. Cl. ...................... 260/28.5 R; 260/29.6 RW; 260/29.6 WB; 260/29.6 TA
[58] Field of Search .................. 260/29.6 RW, 876 R, 260/885, 28.5 R

[56] References Cited

U.S. PATENT DOCUMENTS

| | | | |
|---|---|---|---|
| 3,244,655 | 4/1966 | Sullivan et al. | 260/885 |
| 3,282,876 | 11/1966 | Williams et al. | 260/885 |
| 3,328,325 | 6/1967 | Zdanowski | 260/22 |
| 3,366,590 | 1/1968 | Taft | 260/885 |
| 3,404,114 | 10/1968 | Snyder | 260/29.6 RW |
| 3,467,610 | 9/1969 | Fiarman et al. | 260/22 |
| 3,573,239 | 3/1971 | Zdanowski et al. | 260/22 |
| 3,793,402 | 2/1974 | Owens | 260/885 |
| 3,808,180 | 4/1974 | Owens | 260/885 |
| 3,833,686 | 9/1974 | Grochowski et al. | 260/876 R |
| 3,935,368 | 1/1976 | Weiss | 428/337 |

*Primary Examiner*—Lewis T. Jacobs
*Attorney, Agent, or Firm*—Harold L. Greenwald

[57] ABSTRACT

This invention relates to a latex of internally plasticized polymer particles, low in viscosity although high in hydrophilic components and film forming at temperatures below the calculated Tg of the polymer. The polymer may be prepared by a multistage emulsion polymerization process. The first stage is highly water-swellable or water-soluble. The principal second or later stage is less hydrophilic and of higher Tg than the first stage and is polymerized in the emulsion in the presence of the first stage.

29 Claims, No Drawings

INTERNALLY PLASTICIZED POLYMER LATEX

CROSS-REFERENCE TO RELATED APPLICATION

This application is a continuation-in-part of application Ser. No. 778,819 filed Mar. 17, 1977, now abandoned.

BACKGROUND OF THE INVENTION

This invention relates to a polymer latex in which the arrangement of the polymer molecules in the latex particle is novel. The latexes are useful in the formation of coatings, adhesives and binders. They are particularly useful to supplant combinations of polymers and coalescents in polish and coatings compositions. The polishes or coatings may be applied to either hard or soft surfaces and are especially useful for application to flooring and wall surfaces to form clear coatings having a glossy appearance.

The polymer in a film-forming latex is required to be soft enough to form a film of good integrity yet hard enough so the film has high strength, low dirt pick-up and a myriad of other related properties depending on the specific application. It is known that if the glass transition temperature (Tg) of the polymer is below the temperature at which the film is being formed, a film of good integrity, that is, not "cheesy", is normally produced on drying a latex. However, the very softness of the latex particles which leads to good film formation means that the produced film is soft or tacky as opposed to being strong, hard, wear resistant and tough. The art recognized way out of the dilemma of having a polymer which is soft enough to form a well integrated film yet hard enough to form a useful film is to add coalescents volatile enough to leave the film after film formation has occurred. With the advent of greater concern about air pollution, there has arisen the need to eliminate the volatile coalescents if possible. Elimination of the coalescents is also economical, the cost of the coalescent being saved.

Another approach toward preparing high Tg polymers with low minimum film formation temperatures (MFT) is the incorporation of a high proportion of hydrophilic monomers (e.g. those with hydroxyl, amine or carboxyl functions) in the polymer. This induces water swelling of the latex particles which simultaneously softens the particle in the latex. At normal polymer concentrations the swelling is accompanied by very high viscosities particularly if the storage or use pH is such that the carboxylic groups or amine groups are neutralized or partially neutralized. A further disadvantage is water sensitivity of the final film as well as sensitivity to acidic or basic solutions. Polymers of hydrophilic monomers made by solution polymerization procedures and applied in solution are taught by J. Weiss in U.S. Pat. No. 3,935,368 for use in coating vinyl chloride flooring materials.

Still another solution to the problem of getting hard coating in the form of a well integrated film is that of D. Schoenholz et al. in U.S. Pat. No. 3,949,107. Schoenholz teaches applying a polish containing an aqueous dispersion of a resin with a Tg of 30° C. to 80° C. to a floor, having either the polish or the floor preheated to a temperature above the Tg of the resin.

This disclosure teaches a latex low enough in viscosity to make suitable formulations for application and which, without coalescents, is film forming and produces tough, hard films.

BRIEF SUMMARY OF THE INVENTION

This invention relates to a process for producing a latex of internally plasticized polymer particles, the polymers produced by the process and polishes and other products made from the latex.

In the present invention it is taught that the sequential polymerization of a hard (high Tg) relatively hydrophobic monomer system onto soft (low Tg) hydrophilic functionalized copolymer latex particles, to form latex particles which for convenience are called internally plasticized polymer latex particles, produces a latex low in viscosity yet film forming at a temperature low in comparison to the calculated Tg of the polymer in the particles. The viscosity and the MFT are measured under normal use conditions, i.e. neutral to high pH for acid-containing polymers and neutral to low pH for base-containing polymers. Preferably, the latex of internally plasticized polymer particles is made as follows:

Under normal emulsion polymerization conditions a water-swellable addition polymer is prepared. This water swellable polymer may also be water soluble at an appropriate pH and normally is soluble at high pH when containing acid groups or at low pH when containing basic groups. Under the conditions of polymerization, however, it does not dissolve in the aqueous medium but is maintained as a latex. A second polymer, polymerized in the presence of, interacting with and possibly interpenetrating the first, is formed by the addition of certain monomers less water sensitive, i.e. less hydrophilic, and normally harder than the initial monomer system.

The second monomer system is chosen to have sufficient compatibility with the initial polymer so as to swell the initial polymer. The second polymer in its interaction with the first serves to sharply limit the water swellability of the first polymer. Thus, the product can be considered to be a hydroplastic first polymer hardened and made more hydrophobic by the second polymer or alternatively a hard hydrophobic second polymer made softer and more hydroplastic by the first polymer. The internally plasticized polymer formed has properties unlike the properties of either parent type of polymer nor are the properties simply the sum or average of the properties of the parents. For example, if the first polymer is one which is completely soluble at high pH it is found that after the internally plasticized polymer is formed this first polymer portion is no longer soluble even at very high pH values.

A highly water swellable component polymer would be expected to produce a high viscosity latex, even though the MFT might be low compared to the Tg. In this invention, the modification of the properties of the water swellable first stage polymer by the second stage results in the relatively low viscosity of the latex.

The preferred polymers of this invention comprise at least one of acrylate, methacrylate, vinyl ester and vinyl aromatic mer units. The preferred hydrophilic ionic mers in the polymers comprise a carboxylic acid group. The preferred hydrophilic nonionic mers in the polymer comprise hydroxyalkyl esters of carboxylic acids or vinyl alcohol mers.

This invention concerns a latex of internally plasticized addition polymer particles, having a calculated Tg above about 20° C., comprising: (A) a first stage polymer comprising at least 10% hydrophilic mer units comprising 0.5 to 90% acid or base units, in the unneutralized or neutralized form, and about 99.5% to 10% nonionic hydrophilic units and (B) a later stage, less hydrophilic, polymer polymerized in the presence of an emulsion of the first stage polymer, wherein the first and later stage polymers are each at least about 20% of the addition polymer, by weight; the latex having (1) a viscosity below about 5,000 centipoises, at 20% solids over the pH range 4 to 10, and (2) a minimum film temperature more than 5° C. below the calculated Tg of the addition polymer.

This invention is also expressable as a latex of internally plasticized addition polymer particles comprising:
  (A) a first stage polymer, polymerized from a monomer mix consisting essentially of monoethylenically unsaturated monomers, comprising, by weight, at least 10% hydrophilic mers, the hydrophilic mers comprising at least 10% nonionic and at least 0.5% ionic mers, and
  (B) a less hydrophilic, higher Tg, later stage polymer polymerized in the presence of an emulsion of the first stage polymer;
(A) being from 20% to 80% of the combined weight of (A) and (B); the interpenetration parameter of (A) being greater than that of (B) by up to eight units.

DETAILED DESCRIPTION

The internally plasticized polymer of this invention is formed by emulsion polymerization of a first ethylenically unsaturated monomer system comprising comparatively hydrophilic monomers and then polymerizing a second charge of ethylenically unsaturated monomers which are by themselves, the precursors of a harder and more hydrophobic polymer than the first charge polymer. The polymer formed by the first charge or stage is maintained as an emulsion although it is water swellable or water soluble. Water soluble, in this usage, means soluble in water when the pH of the water is adjusted by the addition of acid or base to completely or partially neutralize the polymer. Water swellable means that the polymer imbibes water or can be made to imbibe water by pH adjustment as above. It is preferred that the pH range considered useful be from about 4 to about 10. The swelling ratio of the swellable polymer, i.e., the volume of the polymer swollen in a large excess of water divided by the volume of the polymer when dry, is preferably greater than two or more preferably greater than six.

The mode of operation of the hydrophilic monomer, included in amounts ranging from about 10 to about 100 parts per hundred parts of first charge monomer is believed to be understood but the evidence is not so conclusive that it should be considered binding. It appears that the hydrophilic monomer serves, when polymerized, to bind whatever amounts of water are transmitted into the composition, in the manner of water of hydration, for example. Any monomer which can be polymerized in the mix and which is hydrophilic enough to effectively bind water is contemplated within the scope of the invention. Among the hydrophilic monomers which can be mentioned, by way of example only, are acrylonitrile, methacrylonitrile, hydroxy-substituted alkyl and aryl acrylates and methacrylates, polyether acrylates and methacrylates, alky-phosphato-alkyl acrylates and methacrylates, alkyl-phosphono-alkyl acrylates and methacrylates, acrylic acid, methacrylic acid, maleic acid, maleic anhydride, N-vinyl pyrrolidone, alkyl and substituted alkyl amides of acrylic acid, methacrylic acid, maleic acid (mono- and di-amides), fumaric acid (mono- and di-amides), itaconic acid (mono- and di-amides), acrylamide, methacrylamide, also other half acid forms of the above dibasic acids such as half esters, amino monomers such as amino-substituted alkyl acrylates and methacrylates, vinyl pyridines and amino alkyl vinyl ethers, and ureido monomers, including those with cyclic ureido groups, and the like. Many others will occur to those skilled in the art, and the scope of the present invention should be interpreted to include such hydrophilic monomers generally. The proper scope of the invention should also be interpreted to include variations on the inclusion of the hydrophilic monomer, such as, for example, when a monomer is included in the polymerization mix which is not itself hydrophilic, but is altered in processing or in a subsequent step, e.g. by hydrolysis or the like, to provide hydrophilicity; anhydride- and epoxide-containing monomers are examples.

Among the effective hydrophilic monomers, it is preferred to utilize acrylic compounds, particularly the amides and hydroxy alkyl esters of methacrylic and acrylic acids, amides and hydroxy alkyl esters of other acids are also preferred, but less so than the corresponding methacrylates and acrylates, which are more readily polymerized. Monomers containing carboxylic acid are also preferred particularly acrylic acid, methacrylic acid and itaconic acid. Another preferred group of hydrophilic monomers are those representing specific examples of potential hydrophilic monomers which produce the actual hydrophilic mer units in the polymer by a hydrolysis process. These monomers are the esters of vinyl alcohol such as vinyl formate, vinyl acetate, vinyl propionate, vinyl butyrate, and vinyl versitate. Hydrolysis of these monomers produces vinyl alcohol mer units in the polymer which mer units are hydrophilic. The preferred monomer of these is vinyl acetate.

Polymerized with the hydrophilic monomers in the first charge are other monomers carefully chosen to give other desirable properties to the final polymer. Any polyethylenically unsaturated monomers, if present, are preferably of the type in which the various ethylenic groups, i.e. the addition polymerizable unsaturated groups, participate in the polymerization at about the same rate. Preferably no such crosslinking or graftlinking polyethylenically unsaturated monomers are present in the first stage monomer system. The term graft-linking monomer is defined in U.S. Pat. No. 3,796,771 column 4, line 66 to column 5, line 20 hereby incorporated by reference. Preferably the first charge monomers are monoethylenically unsaturated.

It is desired that the first charge polymer be softer than the second charge polymer. The hardness of the first charge is controlled by the choice of the hydrophilic monomers and of the comonomers used therewith. The polymerizable comonomers which form soft polymers in the presence of free radical catalysts desirably include any primary and secondary alkyl acrylate, with alkyl substituents up to eighteen or more carbon atoms, primary or secondary alkyl methacrylates with alkyl substituents of five to eighteen or more carbon atoms, or other ethylenically-unsaturated compounds which are polymerizable with free radical catalysts to form soft solid polymers, including vinyl esters of saturated monocarboxylic acids of more than two carbon atoms. The preferred ethylenically unsaturated compounds are the stated acrylates and methacrylates and of these the most practical esters are those with alkyl groups of not over 8 carbon atoms.

The preferred monomers which by themselves yield soft polymers may be summarized by the formula

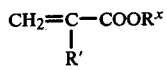

wherein R' is hydrogen or the methyl group and R$^x$ represents, when R' is methyl, a primary or secondary alkyl group of 5 to 18 carbon atoms, or, when R' is hydrogen, an alkyl group of not over 18 carbon atoms, preferably of 1 to 8 carbon atoms and more preferably 1 to 4 carbon atoms.

Typical compounds coming within the above definition are methyl acrylate, ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexylacrylate, decyl acrylate, dodecyl acrylate, cetyl acrylate, octadecyl acrylate, octadecenyl acrylate, n-amyl methacrylate, sec-amyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, and those with substituted alkyl groups such as butoxyethyl acrylate or methacrylate.

As polymerizable ethylenically unsaturated monomers, which by themselves form hard polymers, there may be used alkyl methacrylates having alkyl groups of not over four carbon atoms, also tert-amyl methacrylate, ter-butyl or tert-amyl acrylate, cyclohexyl, benzyl or isobornyl acrylate or methacrylate, acrylonitrile, or methacrylonitrile, these constituting a preferred group of the compounds forming hard polymers. Styrene, vinyl chloride, chlorostyrene, vinyl acetate and α-methylstyrene, which also form hard polymers, may be used.

Preferred monomers, which by themselves form hard polymers, may be summarized by the formula

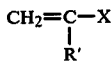

wherein R' is hydrogen or the methyl group and wherein X represents one of the groups —CN, phenyl, methylphenyl, and ester-forming groups, —COOR", wherein R" is cyclohexyl or, when R' is hydrogen, a tert-alkyl group of four to five carbon atoms, or, when R' is methyl, an alkyl group of one to four carbon atoms. Some typical examples of these have already been named. Other specific compounds are methyl methacrylate, ethyl methacrylate, propyl methacrylate, isopropyl methacrylate, isobutyl methacrylate, n-butyl methacrylate, sec-butyl methacrylate, and tert-butyl methacrylate. Acrylamide and methacrylamide may also be used as hardening components of the copolymer.

These monomers may contain other functional groups for other purposes such as to produce crosslinking in the polymer on curing or enhanced adhesion to a substrate. Examples of such functional groups are carboxyl, in the form of the free acid or salt, amido including substituted amido, such as alkoxy alkyl amido and alkylol amido, epoxy, hydroxy, amino including oxazolidinyl and oxazinyl, and ureido. In most instances these functional groups are also hydrophilic groups, and many of the monomers are hydrophilic.

Another group of monomers of this invention which by themselves yield soft polymers are butadiene, chloroprene, isobutene, and isoprene. These are monomers commonly used in rubber latices along with a hard monomer also useful in this invention, such as acrylonitrile, styrene, and other hard monomers as given above. The olefin monomers, particularly ethylene and propylene, are suitable for soft monomers. Particularly useful first stage copolymers are ethylene/ethyl acrylate copolymers and ethylene/vinyl acetate copolymers containing added hydrophilic monomer.

A further class of polymers of this invention are polymers of the esters of vinyl alcohol such as vinyl formate, vinyl acetate, vinyl propionate, vinyl butyrate and vinyl versitate. Preferred is poly(vinyl acetate) and copolymers of vinyl acetate with one or more of the following monomers: vinyl chloride, vinylidene chloride styrene, vinyl toluene, acrylonitrile, methacrylonitrile, acrylate or methacrylate esters, and the functional group containing monomers given above. In the largely vinyl ester polymers it is preferred that the first stage polymers contain at least 10% and preferably at least 30% by weight vinyl acetate units with at least 80% being most preferred. Before polymerization of vinyl alcohol esters is complete some hydrolysis to vinyl alcohol mer units normally occurs or is accomplished. The vinyl alcohol mer units so produced are hydrophilic and considered here as though derived from vinyl alcohol monomer. The amount of hydrolysis can be controlled by means of control of the time, temperature and pH of the reaction to produce the desired amount of vinyl alcohol in the product. Longer times, higher temperatures, very acidic or very alkaline conditions all serve to increase the amount of hydrolysis and thus the amount of vinyl alcohol in the final product. The amount of hydrolysis can be determined by acid-base titration procedures in water or in suitable solvent systems.

A preferred composition of this invention is one in which the monomers of the first stage comprise 65 to 85% $C_1$-$C_4$ alkyl acrylate, $C_1$-$C_4$ alkyl methacrylate, styrene, or a mixture thereof, 5 to 10% acrylic acid, methacrylic acid, itaconic acid, or a mixture thereof and 10 to 25% hydroxy $C_1$-$C_4$ alkyl acrylate, hydroxy $C_1$-$C_4$ alkyl methacrylate or a mixture thereof, by weight, and the monomers of the later stage polymer consist essentially of methyl methacrylate, styrene, or a mixture thereof. Another preferred composition is one in which the mer units of the first stage comprise 50 to 85% vinyl acetate, 1 to 10% acrylic acid, methacrylic acid, itaconic acid, maleic acid (derivable from maleic anhydride) or a mixture thereof, and 8 to 25% vinyl alcohol, by weight, and the mer units of the last stage consist essentially of methyl methacrylate, or styrene mers or a mixture thereof and 0 to 30%, preferably 10 to 20%, by weight acid, such as acrylic, methacrylic or itaconic, mers. It is desirable that the acid component of the first stage comprise up to 5%, based on the polymer weight, of maleic anhydride or maleic acid with 0.2 to 2 percent being preferred. In this usage, the term "mer" means the unit, in the addition polymer, derived from the named monomer by addition to the double bond.

In general the preferred hydrophilic monomers of this invention are monomers with a solubility of at least six grams per 100 grams of water, those with a solubility of at least 20 grams per 100 grams of water are more preferred and most preferred are those in which at least 50 grams of the monomer is soluble in 100 grams of water. The first stage polymer contains at least 10% hydrophilic monomers, 10% to 70% being preferred, at least 25% is more preferable with the range 25% to 35% being most preferable. Of the hydrophilic monomer content it is desirable to have at least 0.5% be acidic groups, such as carboxyl group, or basic groups, such as amino groups, in either the unneutralized or neutralized form. It is also desirable that at least 10% of the hydrophilic monomer be nonionic, i.e. not ionizable, such as hydroxyethyl acrylate or methacrylate, or produce nonionic mer units such as these hydroxyethyl ester and vinyl alcohol mer units.

The last stage polymer is more hydrophobic and preferably harder than the first stage. By more hydrophobic is meant that the later stage polymer if polymerized alone is less water-swellable than is the first stage polymer. By harder is meant that the modulus of the later stage polymer is greater than that of the first stage polymer the measurements being conducted on polymer samples immersed in water. It is preferred that the last stage monomers be monoethylenically unsaturated.

The internally plasticized polymers of the present invention are usually prepared by emulsion polymerization procedures utilizing a multi-stage or sequential technique. However, they may also be prepared by a continuous polymerization in which the composition of the monomers being fed continuously is changed, either step-wise or continuously, during the polymerization. In such a polymerization any discontinuous change in the composition of the monomer feed may be regarded as a stage terminal. If there are no abrupt, or appreciably steeper than average, changes in the feed composition to indicate a change from one stage to another, one may regard the first half of the polymer feed as representing one stage and the second half as representing a second stage. In simplest form, the hydrophilic polymer is formed in a first stage and the hydrophobic harder polymer is formed in a second stage. Either of the polymers can themselves also be sequentially polymerized, i.e. consist of multiple stages. The monomers of the first stage, together with initiators, soap or emulsifier, polymerization modifiers or chain transfer agents, and the like are formed into the initial polymerization mix and polymerized, e.g., by heating, mixing, cooling as required, in well known and wholly conventional fashion until the monomers are substantially depleted. Monomers of the second and in turn of any additional stage are then added with appropriate other materials so that the desired polymerization of each stage occurs in sequence to substantial exhaustion of the monomers. It is preferred that in each stage subsequent to the first, the amounts of initiator and soap, if any, are maintained at a level such that polymerization occurs in existing particles, and no substantial number of new particles, or "seeds" form in the emulsion.

When polymerizations are conducted in multi-stage, sequential processes, there can additionally be stages which are, in composition and proportion, the combination of the two distinct stages, and which produce polymers having properties which are intermediate therebetween. The hydrophilic first stage is preferably between 20% and 80%, more preferably between 30% and 70% and most preferably between 40% and 60% of the total polymer. There may of course, be lesser stages present before, between or after these two of principal interest. These other stages are always either smaller than the principal stages or can be considered a portion of one or the other of the principal stages as indicated by their composition. It is preferred that the polymerization be in two stages. Those skilled in a given art field will usually prepare a few internally plasticized polymer latex samples differing in first to second stage weight ratio and select the one with the best properties for the given application. The equal weight ratio is the starting point for these trials which usually consist of one higher and one lower ratio with the spread of the ratio being chosen by consideration of the final properties desired, e.g., hardness, MFT, latex viscosity, tack-free time, etc.

The copolymer is preferably made by the emulsion copolymerization of the several monomers in the proper proportions. Conventional emulsion polymerization techniques are described in U.S. Pat. Nos. 2,754,280 and 2,795,564. Thus the monomers may be emulsified with an anionic, a cationic, or a nonionic dispersing agent, about 0.5% to 10% thereof being used on the weight of total monomers. When water-soluble monomers are used, the dispersing agent serves to emulsify the other monomers. A polymerization initiator of the free radical type, such as ammonium or potassium persulfate, may be used alone or in conjunction with an accelerator, such as potassium metabisulfite, or sodium thiosulfate. The initiator and accelerator, commonly referred to as catalyst, may be used in proportions of $\frac{1}{2}$ to 2% each based on the weight of monomers to be copolymerized. The polymerization temperature may be from room temperature to 90° C. or more as is conventional.

Examples of emulsifiers or soaps suited to the polymerization process of the present invention include alkali metal and ammonium salts of alkyl, aryl, alkaryl, and aralkyl sulfonates, sulfates, and polyether sulfates; the corresponding phosphates and phosphonates; and ethoxylated fatty acids, esters, alcohols, amines, amides and alkyl phenols.

Chain transfer agents, including mercaptans, polymercaptans, and polyhalogen compounds, are often desirable in the polymerization mix.

Another way of describing and defining the first and second stage monomers of this invention is by use of the solubility parameter concept. "Polymer Handbook", 2nd Edition, J. Brandrup and E. H. Immergut, editors (John Wiley and Sons, New York 1975) Section IV Part 15 entitled "Solubility Paramter Values" by H. Burrell, on pages IV-337 to IV-359, herein incorporated by reference, defines solubility parameter, describes how it is determined or calculated, contains tables of solubility parameters and gives further references to the scientific literature on solubility parameters. The solubility parameter is the square root of the cohesive enereqy density which in turn is the numerical value of the potential energy of 1 cc. of material, the potential resulting from the van der Waals attraction forces between the molecules in a liquid or solid. Burrell describes a number of ways of calculating solubility parameters from experimentally determined physical constants and two ways of calculating them from the structural formula of a molecule. The structural formula methods are normally used when the data for the calculation from physical constants are not available or are considered particularly unreliable. Calculation from the structural formula utilizes tables of group molar attraction constants such as those given on page IV-339 in the Handbook. The table of Small is preferred.

The solubility parameter concept may be considered an extension of the old rule "like dissolves like" recognized from the early days of chemistry. A noncrosslinked polymer will normally dissolve in a solvent of similar solubility parameter and a crosslinked polymer will normally be swollen by a solvent of similar solubility parameter. Conversely, solvents with solubility parameters far from those of the polymers will neither dissolve nor swell the polymer. As given by Burrell the solubility parameter of polymers may be determined, among other ways, by measuring the swelling of the polymer in a series of solvents. Solubility parameter for polymers may also be estimated by calculation from the group molar attraction constants as mentioned above. In the usual situation, it is found that solvents with a range of solubility parameters around that of the polymer will dissolve the uncrosslinked polymer. Those skilled in the art have added the further refinement of classifying solvents as poorly, moderately and strongly hydrogen bonded. It is found that the range of solubility parameter for dissolving a given uncrosslinked polymer differs from one class to the next although usually considerable overlap is observed. Burrell's Table 4 starting on page IV-349 gives ranges of solubility parameters for poorly, moderately and strongly hydrogen bonded solvents used to dissolve a large number of polymers. In Table 5 starting on page IV-354, there is given solubility parameters of a number of polymers determined by calculation and by other methods.

To form the internally plasticized polymer system of this invention the first stage polymer and monomers of the later stage must be carefully chosen so as to interact to an appropriate degree. There are both upper and lower limits to the degree of compatibility desired between the first stage polymer and the monomer charges of later (second or last as hereinabove described) stages. It is found that the appropriate degree of compatibility may be expressed in numerical terms by a property based on solubility parameter and herein named the interpenetration parameter, Ip. The interpenetration parameter may be regarded as a solubility parameter adjusted so as to put strongly, moderately and weakly hydrogen bonding solvents on the same scale. For a given molecule, *the interpenetration parameter is defined as the solubility parameter plus the hydrogen bonding increment value given below*. Solubility parameters of various molecules, including a number of monomers, are given in Tables 1 and 2 of Burrell starting on page IV-341. These tables also give the hydrogen bonding group appropriate for the given molecule. The increment values, a new teaching in this invention, are 17.2 for strongly hydrogen bonding molecules, 7.2 for moderate hydrogen bonding molecules and 2.8 for poorly hydrogen bonding molecules.

The following table contains a list of monomers along with values of their solubility parameter, interpenetration parameter and water solubility. Also given is the hydrogen bonding class appropriate for the monomer. The solubility parameter values and hydrogen bonding class of most of these monomers are those given in Table 1 of Burrell. Vinyl alcohol is a special case because, as is well known, this monomer does not have a stable existence. Polymers containing mer units corresponding to vinyl alcohol may be prepared by hydrolysis of a polymer containing the corresponding vinyl ester, such as vinyl acetate, mer unit. The solubility parameter of this hypothetical monomer is computed by the method of Small as indicated above. Values for other monomers not in Burrell's table are determined or computed following the teachings in Burrell's writings v.s. Dimensions for the solubility parameters given in the table are the usual ones, square root of (calories per cubic centimeter). The interpenetration parameter has the same dimensions. Water solubility is given in grams of monomer per 100 grams of water at 25° C. The hydrogen bonding class strong, moderate or poor is ascertained by using the method of C. M. Hansen, Journal of Paint Technology, Vol. 39, p. 104–117 and 505–514 (1967).

| Monomer | Solubility Parameter | Hydrogen Bonding | Interpenetration Parameter | Water Solubility | Abbreviation |
|---|---|---|---|---|---|
| Acrolein | 9.8 | S | 27.0 | 40 | Acr. |
| Acrylic Acid | 12.0 | S | 29.2 | CM | AA |
| Acrylonitrile | 10.5 | P | 13.3 | 25–30 | AN |
| o-bromostyrene | 9.8 | P | 12.6 | | BrSt |
| 1,3-butadiene | 7.1 | P | 9.9 | | Bd |
| i-butyl acrylate | 8.5 | M | 15.2 | 0.2 | iBA |
| n-butyl acrylate | 8.8 | M | 16.0 | 0.2 | BA |
| Butyl methacrylate | 8.2 | M | 15.4 | 0.01 | BMA |
| Chlorostyrene | 9.5 | P | 12.3 | | ClSt |
| i-decyl acrylate | 8.2 | M | 15.4 | 0.01 | iDA |
| Dichloroethylene | 9.1 | P | 11.9 | 0.01 | DCE |
| Ethyl acrylate | 8.6 | M | 15.8 | 1.51 | EA |
| Ethylene oxide | 11.1 | M | 18.3 | CM | EO |
| Ethylene epichlorohydrin | 12.2 | S | 29.4 | | EEPC |
| Dimethylamino ethyl methacrylate | 7.0 | S | 24.2 | CM | DMAEMA |
| Dihydroxypropyl methacrylate | 9.0 | S | 26.2 | CM | DHPMA |
| Ethylhexyl acrylate | 7.8 | M | 15.0 | | EHA |
| Ethyl methacrylate | 8.3 | M | 15.5 | 0.1 | EMA |
| 1-hexene | 7.4 | P | 10.2 | | hex |
| Hydroxyethyl methacrylate | 8.0 | S | 25.2 | | HEMA |
| Isoprene | 7.4 | P | 10.2 | | Ipn |
| Maleic anhydride | 13.6 | S | 30.8 | 16.3 (79)[1] | MAn |
| Methacrylic acid | 11.2 | S | 28.4 | CM | MAA |
| Methyl acrylate | 8.9 | M | 16.1 | 5.2 | MA |
| Methyl methacrylate | 8.8 | M | 16.0 | 1.6 | MMA |
| α-methylstyrene | 8.5 | P | 11.3 | | MeSt |
| Styrene | 9.3 | P | 12.1 | | ST |

-continued

| Monomer | Solubility Parameter | Hydrogen Bonding | Interpenetration Parameter | Water Solubility | Abbreviation |
|---|---|---|---|---|---|
| Vinyl acetate | 9.0 | M | 16.2 | 2.3 | VAc |
| Vinyl chloride | 7.8 | M | 15.0 | | VCl |
| Vinyl toluene | 9.1 | P | 11.9 | | Vtol |
| (Vinyl alcohol) | 8.4 | S | 25.6 | (CM) | VOH |

S = Strong
P = Poor
M = Moderate
CM = Completely Miscible
1 As maleic acid

For a latex polymer of this invention, the interpenetration parameter of the first stage is greater than that of the second stage, preferably at least one unit (calorie per cubic centimeter) greater. However, the interpenetration parameter of the first stage must not be too much greater than that of the second stage. The difference is not more than 8 and is desirably between 1 and 6 units. When the first stage polymer contains 65% or more, by weight, of $C_1$-$C_4$ alkyl acrylate, $C_1$-$C_4$ alkyl methacrylate, styrene or a mixture thereof, it is desirable that the first stage Ip be not more than 6 units greater than that of the later stage with a difference of 1 to 4 units being preferred and 2 to 3 units most preferred. When the first stage polymer contains 50% or more, by weight, of vinyl acetate it is desirable that the first stage Ip be 1 to 8 units greater than that of the later stage with a difference of 2 to 6 units being preferred and 4 to 5 units most preferred. It should be appreciated in this context that the second stage or the later stage may contain some hydrophilic monomers and still conform to these rules for the difference between the interpenetration parameter of the first stage and that of the second stage.

In a preferred embodiment of this invention, the first stage contains acidic, preferably carboxylic, mer units as well as other hydrophilic mer units. The carboxylic mer units are preferably obtained from the monomers acrylic acid, methacrylic acid or itaconic acid. The other hydrophilic mer units are preferably hydroxy $C_1$-$C_4$ alkyl methacrylate, hydroxy $C_1$-$C_4$ alkyl acrylate or vinyl alcohol units.

The viscosity of the polymer emulsion produced is measured by any of the procedures known to those skilled in the art, preferably there is employed a Brookfield Synchro-Letric viscometer model LV 1 with preference in choice of spindle and speed being given to the combinations which will result in a mid-range reading. Measurements, at 20° C., are made at pH values in the range of 3 to 10 on emulsions adjusted, with water, to 20% solids content. The pH of acid-containing copolymer emulsions is generally adjusted by the use of a mineral base, an organic base, such as an amine, or ammonia with the latter being preferred. Internally plasticized polymer latices containing basic groups, such as amine groups or quaternary ammonium groups, have their pH adjusted by the use of mineral acids, such as hydrochloric acid, or organic acids such as acetic acid. The latex viscosity, over the pH range 3 to 10, is generally below 5,000 centipoises, better still below 500 centipoises, better still below 150 centipoises, better still below 40 centipoises, and most preferably below 10 centipoises; the lower values being particularly desirable for certain applications, such as floor polishes.

The minimum film temperature (MFT) is determined on a film cast from the latex at 20% solids and a pH normally in the range between 7½ and 9 for ammonia-neutralized, acid-containing polymers and in the neighborhood of 3-4 for acetic acid neutralized base containing polymers. The procedure of The American Society for Testing Materials method D2354-68 is followed. The MFT is more than 5° C. below the calculated glass transition temperature (Tg) of the polymer when the Tg is above 5° C. Preferred are MFTs below 18° C. with polymers having a Tg calculated for the entire polymer composition of greater than 25° C. The term MFT, as used herein to define certain polymers, refers to the value determined on a latex at the pH and solids given above in this paragraph. In some of the examples hereinbelow, MFT values determined under other conditions are given only for comparison purposes and are not the MFTs used in defining the polymers of this invention.

Hardness is expressed as Knoop Hardness Number (KHN) determined by means of the Tukon Microhardness Tester on a film formed by casting the latex on a solid substrate such as a glass panel. It is preferred that the polymers have a KHN greater than 3 with greater than 5 being more preferred and greater than 8 most preferred.

The calculated Tg of each stage and that of the overall polymer is determined by calculation based upon the Tg of homopolymers of individual monomers as described by Fox, Bull. Am. Physics Soc. 1, 3, page 123 (1956). Tables of the Tg of hompolymers are given in "Polymer Handbook" Section III, Part 2 by W. A. Lee and R. A. Rutherford. The desired calculated Tg of the first stage is less than 40° C. with less than 5° C. being preferred and less than −10° C. being most preferred. The desired calculated Tg of the second stage is greater than 35° C. with greater than 75° C. being preferred and greater than 100° C. being most preferred. The calculated Tg of the polymer based on the overall polymer composition is preferably greater than 20° C. with greater than 30° C. being preferred for floor polish and similar uses. For some other uses, such as adhesives, binders and paints, polymers with calculated Tg values below about 40° C., including subzero values, are suitable.

The internally plasticized polymer emulsions of this invention have a noteworthy combination of properties especially (1) low minimum film temperature coupled with high hardness and high Tg; and (2) low polymer emulsion viscosity even when neutralized. Thus, comparatively hard latex polymer systems can be used with much less coalescent than usual, or no coalescent at all. This utility is particularly valuable in situations in which the coalescent gives rise to secondary disadvantages. Because of the absence or minimization of added coalescent in the formulation, coatings which develop hardness at a very high rate can be made from the polymers of this invention. Further advantages implied by the elimination of added plasticizer, coalescent or organic solvent are lowering of the cost, reduced flammability during the processing and decreased emission of toxic and polluting vapors during and following application. These properties are of particular importance in the formulation and use of water based industrial coatings, both clear and pigmented. In ink technology, the extremely fast drying and nonflammability advantages of internally plasticized polymers are of great importance. In trade sales coatings, the combination of high hardness and low minimum film temperature makes for a block resistant air drying coating. A further advantage of the latex of this invention is that formulation is very easy, which results in a considerable cost saving, because of the fewer ingredients and the ease of mixing in the plant operation. The ease of mixing probably results from the latex made by this invention being resistant to the so-called "shocking" phenomenon; that is, the latex is not easily flocculated or gelled when mixed with another component of the formulation. Thus, ingredients usually may be mixed in any order in the usual plant equipment and, in addition, the equipment itself is left in a much cleaner condition than with ordinary latexes.

As described above, the polymer latexes of this invention are particularly useful to replace the latex plus plasticizer or latex plus coalescent systems which comprise a number of formulations used in a wide variety of applications for polymer latexes. These latexes are useful in forming free films as well as in forming coatings such as in paints, lacquers, varnishes, powdered coatings, and the like. The latexes of this invention are also useful as impregnants and adhesives for both natural and synthetic materials such as paper, textiles, wood, plastics, metal and leather and as binders for nonwoven fabrics. They may be used to lower the minimum filming temperature or to aid in film formation of other latex systems when used in combination therewith. Pigments, dyes, fillers, antioxidants, antiozonants, stabilizers, flow control agents, surfactants or other optional ingredients may be included in the polymer compositions of the invention.

The polymer compositions of this invention can be applied with or without a solvent by casting permanently or removably onto a suitable substrate, particularly for use as coatings, fillers or adhesives. Application by brushing, flowing, dipping, spraying and other means known in the various art fields may be used to apply the latex of this invention. One of the particular advantages of the present invention is that reactive polymers can be prepared for use as air cured or thermally cured coatings, fillers or adhesives without requiring organic solvents, coalescents or plasticizers although small amounts of these materials may be desired. This is particularly valuable for elimination of volatile solvents or other volatiles, such as coalescents, decreases a potential ecological hazard.

It is of especial importance that the acid groups, hydroxyl groups, or other functional groups incorporated in the first stage of the polymerization are available for further reaction such as neutralization or crosslinking. This availability distinguishes the internally plasticized polymer latex from a latex in which a second or later stage so coats or interacts with the first stage as to decrease or eliminate the availability of first stage functional groups for subsequent reactions. The crosslinking referred to may be by any of the usual means, such as coordination crosslinking, ionic crosslinking or the formation of covalent bonds. In general, the reactions of these latices may be ionic or covalent reactions. Ionic reactions are illustrated by the ionic crosslinking in the application of these latices to floor polishes as taught below. The formation of covalent bonds by reaction with aminoplasts, epoxies, isocyanates, beta hydroxyethyl esters and the like are well known in the art.

The polymer latexes of the present invention are particularly useful in formulating floor polish and are advantagously used in the floor polishes taught by Zdanowski, U.S. Pat. No. 3,328,325 hereby incorporated by reference, by Fiarman, U.S. Pat. No. 3,467,610 hereby incorporated by reference, and a second invention of Zdanowski, U.S. Pat. No. 3,573,239 hereby incorporated by reference.

In general polishing compositions using the polymers of the present invention can be defined in terms of the following proportions of the main constituents:

| Constituent: | Proportion |
|---|---|
| (A) Water-insoluble internally plasticized addition polymer, parts by weight | 10–100 |
| (B) Wax, parts by weight | 0–90 |
| (C) Alkali-soluble resin, parts by weight | 0–90 |
| (D) Wetting, emulsifying and dispersing agents, parcent. | 0.5–20 |
| (E) Polyvalent metal compound, percent. | 0–50 |
| (F) Water to make total solids 0.5% to 45%, preferably 5 to 30%. | |

(D) is in weight percent on weight of A+B+C
(E) is in weight percent on weight of A.

The total of A, B and C should be 100. The amount of C, when present, may be up to 90% of the weight of the copolymer of A, and preferably from about 5% to 25% of the weight of the copolymer of A.

For a nonbuffable, self-polishing composition, the wax should not be over 35 parts by weight, preferably 0 to 25 parts by weight in 100 parts total of polymer plus wax according to the above table. Satisfactory nonbuffable floor polish formulations have been prepared without the inclusion of a wax. Thus wax is not an essential component of a self-polishing composition. For a dry buffable polish composition, the wax should be at least 35 parts by weight on such total. Examples of wetting and dispersing agents include alkali metal and amine salts of higher fatty acids having 12 to 18 carbon atoms, such as sodium, potassium, ammonium, or morpholine oleate or ricinoleate, as well as the common nonionic surface active agents. Additional wetting agent improves the spreading action of the polish.

For polishing floors, the coating obtained from the composition preferably has a Knoop hardness number of 0.5 to 20 when measured on a film thereof 0.5–2.5 mils thick on glass. This range of hardness provides good resistance to abrasion and wear and can be obtained by the appropriate selection of monomers to be polymerized.

The following examples, in which the parts and percentages are by weight unless otherwise indicated, are illustrative of the invention.

EXAMPLE 1—Preparation of Internally Plasticized Polymer Emulsion

A latex with first stage, second stage and average Tg values of −14° C., 105° C., and 34° C. respectively, is prepared as follows:

A. Equipment

A five liter, four-necked flask is equipped with a condenser, stirrer, thermometer and monomer addition pumps. Heating, cooling and nitrogen sparging facilities are provided.

B. Material Charges

| | Kettle | Monomer Charges | |
|---|---|---|---|
| Raw Material | Charge | # 1 | # 2 |
| Water | 2008 g | 400 g | 400 g |
| Sodium lauryl sulfate (surfactant) | 16 | 2 | 2 |
| Butyl acrylate (BA) | — | 600 | — |
| Methyl methacrylate (MMA) | — | 140 | 1000 |
| Methacrylic acid (MAA) | — | 60 | — |
| Hydroxyethyl methacrylae (HEMA) | — | 212 | — |
| Sodium persulfate in 100 g Water (catalyst) | 12 | — | — |

C. Procedure

1. Add kettle charge water and surfactant to the kettle and start agitation and nitrogen sparge.
2. Combine the materials of each of the monomer charges and thoroughly mix to create stable monomer emulsions.
3. Heat the kettle to 82°–84° C. with continued agitation and nitrogen sparging.
4. Add the catalyst solution to the kettle and start the addition of monomer charge #1 at such a rate that the addition is completed in about 50 minutes. Maintain the temperature at 82°–84° C. throughout the polymerization.
5. When monomer charge #1 addition is completed hold for 15 minutes at 82°–84° C.
6. After the hold period start the addition of monomer charge #2 at such a rate that the addition is completed in about 60 minutes. Maintain the temperature at 82°–84° C. throughout the polymerization.
7. When monomer charge #2 addition is completed, hold for 30 minutes at 82°–84° C., then cool and filter. A sample of the latex is neutralized to a pH of 9 with ammonia; the MFT is below 15° C. and the viscosity is 15 centipoise (Brookfield Viscosity; 20% solids). A film cast from the neutralized latex has a hardness of 12.1 KHN.

EXAMPLE 2—Sequential Charge Ratio

Following the general procedure of Example 1 three internally plasticized polymer latices are prepared having the same first and second stage compositions but differing in the first to second stage weight ratio.

It is found that the property balance, low MFT and simultaneously low viscosity emulsion, is sensitive to the weight ratio of the hard hydrophobic second stage charge to the soft hydrophilic first stage charge. Thus, in a given monomer composition field, a few experiments may be needed to determine the charge ratio required for the product of this invention. Table 1 shows the effects of changing the charge ratio, Example 2B having a low MFT, low viscosity when neutralized and a high Tg. It is seen that Example 2B is a latex polymer of this invention whereas the Example 2A much too high in viscosity at pH 9 and 2C too high in MFT.

TABLE I

Varying Charge Ratio; Constant Charge Composition

| | Polymer Composition | Tg | | | MFT/Viscosity (20% Solids) | |
|---|---|---|---|---|---|---|
| Example | BA/MMA/MAA/HEMA//MMA* | (1) | (2) | Avg. | pH 3 | pH 9 |
| 2A | 27.6/7.2/7.2/18//40 | 4 | 105 | 38 | 29/2 | 10/18,000 |
| 2B | 23/6/6/15//50 | 4 | 105 | 47 | 40/6 | 10/140 |
| 2C | 18.4/4.8/4.8/12//60 | 4 | 105 | 58 | 76/2 | 62/34 |

*A double slash (//) is used to indicate the separation between the first and second stage.
MFT is in degrees Celcius/viscosity in centipoise at 20° C.
Tg is calculated, in degrees Celcius, for the first stage (1), second stage(2) and overall polymer-Avg.

EXAMPLE 3—Polymerization Process

The difference between a single emulsion copolymer, an internally plasticized polymer and a physical blend of two polymers is seen in the data in Table II. All of the polymers were prepared by emulsion polymerization following essentially the procedure of Example 1 except for there being no second charge in the preparations of Examples 3A and 3C. The overall composition of each of the three examples is the same; the calculated Tg is 47° C.

TABLE II

| | Polymer Composition | | MFT/Viscosity | |
|---|---|---|---|---|
| Example | BA/MMA/MAA/HEMA//MMA | Description | pH 3 | pH 9 |
| 3A | 23/56/6/15//0 | single charge, simple copolymer | 52/3 | 46/55 |
| 3B[b] | 23/6/6/15//50 | internally plasticized polymer | 40/6 | 10/140 |
| 3C | 23/6/6/15//50 | physical blend[a] | 10/10 | 10/gellation |

[a]Physical blend 50:50 of (BA/MMA/MAA/HEMA: 46/12/12/30) and (MMA: 100).
[b]The polymer of Example 33 is the same as that of Example 23.

It is seen, in Table II, that the single charge polymer Example 3A has an MFT in the neighborhood of the calculated Tg. The physical blend, i.e. Example 3C: a blend of an emulsion having the composition of the first stage of the Example 3B polymer with one having the second stage 3B composition, is so viscous at high pH that the emulsion gels even when diluted to 20% solids before pH adjustment. Note that neutralized to a pH of 9 the internally plasticized polymer has a much lower MFT and only a moderately higher viscosity than the single charge copolymer.

EXAMPLE 4—Balance of Hydrophile/Hydrophobe Character of Stages

Using the polymer emulsion of Example 2B as a control, the compositional relationship between the water-swelled first stage polymer and that of the second stage is varied. Interaction of the first stage polymer with the second stage is shown by achievement of internal plasticization, with controlled viscosity, by sequentially charged (1) soft, hydrophilic and functionalized and (2) hard and hydrophobic copolymers. This internal plasticization is demonstrated to depend on the balance of hydrophobe/hydrophile character of the two monomer charges by the data in Table III.

TABLE III

| Example | Composition | Tg (1) | Tg (2) | Avg. | MFT/Viscosity pH 3 | MFT/Viscosity pH 9 |
|---|---|---|---|---|---|---|
| 4A* | BA/MMA/MAA/HEMA//MMA 23/6/6/15//50 | 4 | 100 | 47 | 40/6 | 10/140 |
| 4B | BA/MMA/MAA/HEMA//MMA 29/0/6/15//50 | −13 | 105 | 35 | 30/10 | 10/70 |
| 4C | EA/MAA/HEMA//MMA 29/6/15//50 | 14 | 105 | 53 | 55/10 | 10/1400 |
| 4D | BA/MMA/MAA/HEMA//ST 22.5/6.5/6/15//50 | 4 | 100 | 46 | 20/10 | 10/30,000 |

*The polymer emulsion of Emulsion 4A is the same as that of Example 2B.

The results, in Table III, show that vs. Example 4A a more hydrophobic, i.e. less hydrophilic, first stage polymer is good, 4B; a more hydrophilic first stage, 4C, leads to high viscosity; a too hydrophobic second stage, 4D, leads to very high viscosity at high pH, too high for most uses.

EXAMPLE 5—Interpenetration Parameter

Emulsion polymers of a number of compositions, differing in interpenetration parameter (Ip) of the two stages, are prepared by the procedure of Example 1 or Example 8 (Examples 5E, 5I and 5M). Determinations of the emulsion viscosity and MFT, done on the emulsion neutralized to a pH in the range of 7.5 to 8.5 with ammonia and diluted to 20% polymer solids, and of the film hardness show which of the preparations have formed internally plasticized polymers. Tables IV.A and B present these data.

TABLE IV.A

| Example | Composition | Ratio |
|---|---|---|
| 5A | BA/MMA/MAA/HEMA//MMA | 23/6/6/15//50 |
| 5B | BA/MMA/MAA/HEMA//MMA | 30/7/3/10//50 |
| 5C | BA/MMA/MAA/HEMA//MMA | 30.5/9/3/7.5//50 |
| 5D | BA/MMA/MAA/HEMA//MMA | 34.8/9.4/4.3/8.5//43 |
| 5E | EA/VAc/VOH/MAn/AA//ST | 5.5/37.8/5.6/0.4/0.7//50 |
| 5F | BA/MMA/MAA/DHPMA//MMA | 25/11.5/6/7//50 |
| 5G | BA/MMA/MAA/VAc/VOH//MMA | 23/6/6/13.5/1.5//50 |
| 5H | BA/MMA/DMAEMA//MMA | 18/17/15//50 |
| 5I | EA/VAc/VOH//ST | 24/23.9/2.1//50 |
| 5J | BA/MMA/MAA//ST/AN | 25/21.5/3.5//30/20 |
| 5K | BA/MMA/MAA/HEMA//ST | 22.5/6.5/6/15//50 |
| 5L | MMA//BA/MMA/MAA/HEMA | 50//2.3/6/6/15 |
| 5M | BA/VOH/VAc/MMA | 24/2.1/23.9//50 |
| 5N | BA/MMA/MAA/DHPMA//MMA | 25/11.5/6/7.5//50 |
| 5O | BA/MMA/MAA/HEMA//MMA | 30/7/3/10//50 |
| 5P | BA/MMA/MAA/HEMA//MMA | 30.5/8.25/3.75/7.5//50 |
| 5Q | BA/MMA/MAA//ST/AN | 25/19/6//30/20 |
| 5R | EA/ST/MAA//ST | 21/24/5//50 |

TABLE IV.B

| Example | Viscosity[1] cps. | MFT[2] | KHN[3] | Tg[4] (1) | Tg[4] (2) | Tg[4] Avg. | Ip[5] (1) | Ip[5] (2) | Ip[5] (1-2) |
|---|---|---|---|---|---|---|---|---|---|
| 5A | 140 | <10 | 18 | 4 | 105 | 47 | 20.2 | 16.0 | 4.2 |
| 5B | 5 | <15 | 12 | −14 | 105 | 34 | 18.6 | 16.0 | 2.6 |
| 5C | 3 | 18 | 13 | −14 | 105 | 34 | 18.1 | 16.0 | 2.1 |
| 5D | 5 | 18 | 12 | [2]MFT, 14 | 105 | 28 | 18.3 | 16.0 | 2.3 |
| 5F | 25 | <10 | 15 | 4 | 105 | 47 | 19.0 | 16.0 | 3.0 |
| 5G | 140 | 20 | 14 | −1 | 105 | 43 | 17.8 | 16.0 | 1.8 |
| 5H | 720 | <15 | — | 6 | 105 | 48 | 18.5 | 16.0 | 2.5 |
| 5E | 40 | <15 | 18 | 25 | 100 | 58 | 17.5 | 12.1 | 5.4 |
| 5I | 95 | <15 | — | 3 | 100 | 44 | 16.4 | 12.1 | 4.3 |
| 5J | 20 | 42 | 9 | 6 | 99 | 46 | 16.9 | 12.6 | 4.3 |
| 5K | 30,000 | <10 | 16 | 7 | 100 | 47 | 20.3 | 12.1 | 9.2 |
| 5M | 4,250 | <15 | — | 3 | 105 | 46 | 16.4 | 16.0 | 0.4 |
| 5N | 25 | <10 | 18 | 4 | 105 | 47 | 19.0 | 16.0 | 3.0 |
| 5L | Gel | <10 | — | 105 | 5 | 47 | 16.0 | 20.3 | −4.3 |
| 5O | 5 | <15 | 9 | −14 | 105 | 34 | 18.6 | 16.0 | 2.6 |
| 5P | 5 | <15 | 9 | −14 | 105 | 34 | 18.3 | 16.0 | 2.3 |
| 5Q | 35 | 50 | 10 | 8 | 99 | 49 | 17.5 | 12.6 | 4.9 |

TABLE IV.B-continued

| Example | Viscosity[1] cps. | MFT[2] | KHN[3] | $T_g$[4] (1) | (2) | Avg. | $I_p$[5] (1) | (2) | (1–2) |
|---|---|---|---|---|---|---|---|---|---|
| 5R | 30 | 73 | 16 | 42 | 100 | 69 | 17.2 | 12.1 | 5.1 |

Notes for Table IV.B
[1]Viscosity is measured on the latex, 20% solids brought to a pH of 9 with ammonia except for Example 5H which is at pH of 3 with acetic acid.
[2]MFT, in degrees Celcius, latex supplied at 20% solids and pH 9 with ammonia except Example [3]Hardness (pH3 as above).
3.Hardness is expressed as Knoop Hardness Number (KHN) determined by the procedure given in Resin Review, Vol. XVI, No. 2, p. 9 ff (1966), a publication of the Rohm and Haas Company.
[4]$T_g$ is calculated for a high polymer by the procedure of Fox, v.s. "(1)" and "(2)" represent first and second or later stage and "Avg." the value calculated for the composition as a whole.
[5]$I_p$ is calculated for the first stage (1) and the second stage (2). The difference between these $I_p$ values is tabulated under "(1-2)".

The data in Table IV.B show that an internally plasticized polymer is obtained, as indicated by the glass transition temperature, minimum film temperature, emulsion viscosity and hardness values, when the interpenetration parameter value of the first stage polymer is greater than that of the second but not too much greater. Example 5J, a polymer latex of the prior art, is not one of internally plasticized particles as evidenced by the proximity of the Tg and the MFT. As indicated in Table IV, A this polymer has only seven percent hydrophilic mer units in the first stage polymer. Example 5K is not of internally plasticized particles of this invention as evidenced by its high viscosity; as indicated in Table IV, B its composition is such that an undesirably high difference in the Ip exists between the polymers of the two stages. Example 5L is not of this invention, its viscosity is so high a gel forms; note that the Ip difference between the polymers of the two stages is too low, it is below zero. Examples 5Q and 5R, polymer latexes of the prior art, have MFT values above their Tg values; neither contains nonionic hydrophilic monomers in the first stage.

EXAMPLE 6—Floor Polish

A floor polish is prepared by mixing ingredients in the following recipe (except Examples 6A and 6E as noted below):

| Role | Material | Charge | |
|---|---|---|---|
| Vehicle | Polymer emulsion —15% solids | 100.0 | parts |
| Wax | Poly EM-40 - 15% solids (Trademark, Cosden Oil and Chemical Co.) | 15.0 | parts |
| Wetting aid | Fluorad FC128 - 1% solids (Trademark, 3M Co.) | 0.5 | parts |
| Leveling aid | Tributoxyethyl phosphate - 100% active | 0.5 | parts |
| Defoamer | SWS-211 - 50% solids (Trademark Stauffer Wacker Silicone Corp.) | 0.01 | parts |
| Base | Ammonia - 10% aqueous | to pH 8 | |

The floor polish is applied and tested by the procedure described in detail in *Resin Review*, Volume XVI, No. 2, 1966 published by Rohm and Haas Company, Philadelphia, Pa. 19105 except when another procedure is specified. Polymer emulsions used and the test results obtained are in Table V.A and V.B.

TABLE V.A

| Example | 6A | 6B | 6C | 6D | 6E |
|---|---|---|---|---|---|
| Polymer emulsion | (note 1) | Ex. 2B | Ex. 50 | Ex. 5P (note 3) | Ex. 5E (note 4) |
| Test(note 2) | | | | | |
| Visual gloss | | | | | |
| One coat | g–vg | vg | vg | vg | g–vg |
| Two coats | vg | vg–exc. | vg–exc. | vg–exc. | vg |
| Leveling | | | | | |
| One coat | exc. | exc. | exc. | exc. | exc. |
| Two coats | exc. | exc. | exc. | exc. | exc. |
| 60° gloss (TM 3) | 71 | 82 | 79 | 80 | 77 |
| Heel mark resistance (TM 5) | vg–exc. | g–vg | vg | vg–exc. | fair |
| Water resistance (TM 4) | | | | | |
| One hour | good | exc. | exc. | exc. | exc. |
| One day | g–vg | exc. | exc. | exc. | exc. |
| Detergent resistance (TM 6) | | | | | |
| One day | vg | good | good | vg | — |
| Three days | vg–exc. | — | — | — | fair |
| Seven days | vg–exc. | vg | vg–exc. | vg–exc. | — |
| Removability (TM 7) | vg | exc. | exc. | exc. | fair |
| Static coeff. of friction(TM 1) | 0.5 | 0.6 | 0.6 | 0.6 | — |
| Powdering (TM 2) | slight | nil | nil | nil | — |

Notes for TABLE V.A
1.Example 6A is illustrative of the state of the art. It employs a floor polish polymer emulsion having 1.65% zinc ion crosslinker. This polish is prepared by mixing ingredients in the following recipe:

| Role | Material | Charge | |
|---|---|---|---|
| Vehicle | BA/MMA/MAA copolymer emulsion - 15% solids | 80 | parts |
| Wax | Poly EM-40 - 15% solids (Trademark, Cosden Oil and Chemical Co.) | 15 | parts |
| Alkali Soluble Resin | low molecular weight all acrylic resin - 15% solids | 5 | parts |
| Coalescent | diethyleneglycol monomethylether | 4 | parts |
| Plasticizer | dibutyl phthalate | 1.0 | part |

TABLE V.A-continued

| Example | | 6A | 6B | 6C | 6D | 6E |
|---|---|---|---|---|---|---|
| Wetting aid | Fluorad FC-128 - 1% solids (Trademark, 3M Co.) | | | | 0.4 parts | |
| Leveling aid | tributoxyethyl phosphate - 100% active | | | | 1.0 part | |
| Defoamer | SW-211 - 50% solids (Trademark, Stauffer Wacker Silicone Co.) | | | | 0.01 parts | |

2. Application of the floor polishes is described in ASTM method D1436-64, Method B. (ASTM-American Society for Testing Materials, Philadelphia, Pennsylvania). Test methods, identified in brackets, are listed below.
3. Example 6D is formulated with 1.25% zinc ion on emulsion polymer solids.
4. The recipe for the polish of Example 6E differs from that for 6B, C and D in the omission of wax and defoamer and the addition of 2 parts of coalescent, diethylene-glycol monomethylether.

Test Methods for TABLE V.A - given in brackets in the table.
(TM 1)Slip: ASTM method D2047-72; panels conditioned at 25° C. and 55% relative humidity.
(TM 2)Powdering: ASTM method D2048-69.
(TM 3)60° gloss: ASTM method D1455-64- Vinyl tile (Kentile No. R-44, Kentile Floors, Inc.) substituted for OTVA tile in this test.
(TM 4)Water resistance: ASTM method D1793-66, dynamic test procedure.
(TM 5)Rubber heel mark resistance: CSMA method 9-73 (Chemical Specialties Manufacturers Association, Washington, D.C.), test modified by rotating 15 minutes in each direction.
(TM 6)Detergent resistance is run on black vinyl asbestos tile using 10 ml. of 5% aqueous Forward (trademark S. C. Johnson) detergent, running 50 cycles in the one day, 75 in the three day and 100 cycles in the seven day tests.
(TM 7)Removability is run for 75 cycles using 10 ml. of 3% Spic and Span (trademark Procter & Gamble) and 1% aqueous ammonia, on black vinyl asbestos tile.

Wear tests are carried out in a corridor having a vinyl asbestos tile floor which is subjected to a daily traffic load of 3,500 to 4,000 pedestrian passes. A section of the corridor (10 feet wide by 24 feet long) is cordoned off and stripped of residual polish and repolished in the typical janitorial procedure, as follows:

The floor dust mopped to remove loose dirt, a 1:1 aqueous solution of commercial stripper solution, Step-Off® (S. C. Johnson & Sons, Inc., Racine, Wisconsin 53404) is applied by string mop at a rate of ca. 1,000 square feet/gallon; after a 5 minute soak period, the floor is scrubbed with a 16 inch black stripping floor pad (3M Company, St. Paul, Minn. 55101; Scotch Brite Slim Line Floor Pad #61-6520-0105-0) on a 300 rpm floor machine (Mercury Floor Machines Inc., Englewood, N.J., model H-15-c); the stripped floor is thoroughly rinsed twice by damp mopping with clear water, and allowed to dry. The stripped floor is divided into 6 foot sections perpendicular to the normal direction of corridor traffic flow. To each of these sections a coat of the polish to be tested is applied, with a string mop, at a rate of ca. 2,000 square feet/gallon. After allowing one hour for the initial polish to dry a second coat is applied in the same manner. The appearance of the polishes is rated initially and after one and two weeks of heavy traffic. The results of these observations and other tests, following the procedures used in obtaining the Table V.A. data, are in Table V.B.

TABLE V.B

| Example | 6A | 6B | 6C | 6D |
|---|---|---|---|---|
| Initial: | | | | |
| Gloss (visual) | vg | vg | vg+ | vg+ |
| Leveling | exc | exc | exc | exc |
| Recoatability | exc | vg-exc | vg-exc | exc |
| One week traffic: | | | | |
| Gloss (visual) | g-vg | vg | vg | vg+ |
| Dirt pick-up resistance | exc | exc | exc | exc |
| Black heel mark resistance | vg-exc | vg | vg-exc | vg |
| Scuff resistance | vg-exc | vg+ | vg-exc | vg |
| Two week traffic: | | | | |
| Gloss (visual) | good | good | good+ | good+ |
| Dirt pick-up resistance | vg | vg | vg | vg- |
| Black heel mark resistance | vg | vg- | vg | vg |
| Scuff resistance | g-vg | g-vg- | g-vg | g-vg |

The abbreviations used in Tables V.A and V.B are: exc=excellent; vg=very good; g=good; +=plus; −=minus except when used between abbreviations, where it means "to".

EXAMPLE 7—Lacquer and Paint

The polymer latex of Example 1 is formulated as follows:

Example 7A: Adjust the 40% solids latex to pH 9 with 14% aqueous ammonia.

Example 7B: To 100 parts by weight of the latex, adjusted to pH 8.5 with 14% aqueous ammonia, is added a mixture of 9.7 parts of water and 15.3 parts of butoxyethanol.

Example 7C: The ingredients are mixed as follows:

| | Parts by Weight |
|---|---|
| Water | 4.7 |
| Tamol 165[1] (22% aqueous) | 1.3 |
| Triton CF-10[1] (100%) | 0.16 |
| Nopco NXZ[2] | 0.05 |
| Zopaque RCL-9[3] (TiO$_2$pigment) | 18.8 |
| Grind on high speed disperser (4,000 ft/min.) for 15 min. and letdown under agitation with: | |
| Polymer latex | 70.4 |
| Water | 1.8 |
| Butoxyethanol | 2.8 |
| TOTAL | 100.0 |

[1]Trademark, Rohm and Haas Company, Philadelphia, Pa.
[2]Trademark, Diamond Shamrock Chemical Company
[3]Trademark, Glidden-Durkee Division, SCM Corporation Key lacquer and paint properties are determined by following the usual paint industry procedures. Results of the determinations, on films made from the formulations by coating metal sheets, are in Table VI.

TABLE VI

| Property[1] | Ex. 7A | Ex. 7B | Ex. 7C |
|---|---|---|---|
| Dry to touch/tack free time (min. at 25 C. and 40% R.H.) | 19/21 | | |
| Air dry hardness KHN, 1 hr. at 25 C. and 40% R.H. | 6.5 | | ca. 1 |

TABLE VI-continued

| Property[1] | Ex. 7A | Ex. 7B | Ex. 7C |
|---|---|---|---|
| Ultimate hardness KHN | 6.5 (baked 30 min.) | | 6.5 |
| Hot print (60° C./16 hr./4 psi) (baked 250 F./60') | none | none | v.sl.trace |
| Mandrel flexibility (1.5 mil/ B-1000/1 hr. at 250 F.) | | | |
| ⅛, ¼, 150 inch blends | 0/1/1 | //1 | 117–8 |
| Impact In-Lb (D/R) Alodine 1200S* | 50/16[2] | | |
| T-Bend | T-T₁ | | |
| Water Soak (16 hr. at 100° F.) | moderate rust, no blisters | moderate rust, mod blisters | moderate rust, mod blisters |
| Cleveland Condensing Cabinet (16 hours at 40 C.) | sl. rust, no blisters | | |
| Chemical and stain resistance: | | | |
| Alcohol (16 hours) | moderate attack | moderate attack | moderate attack |
| Ink (30 minutes) | no attack | | |
| Mustard (30 minutes) | no attack | | |
| Lipstick (30 minutes) | no attack | | |
| Gasoline (30 min.) | slight attack | sl. to moderate attack | sl. to moderate attack |

[1]Results determined on 1.5 mil thick films baked 1 hour at 250 F. for film tests unless other conditions are noted.
[2]Air dried films have values of 2/1.

The data in Table VI.A indicate that the Example 7A latex dries very rapidly to full hardness, to form a film which is both hard and flexible, without the aid of a coalescent. Coalescent slows hardness development and has a deleterious effect on some resistance properties. Baking is required to maximize certain properties. The resistance properties are good in general although water soak and alcohol resistance results are not as good as the other results.

Example 7C shows that the latex of Example 1 can be employed to form pigmented films with comparatively little coalescent. The physical properties of the film formed parallels that of the unpigmented film. Other tests on the film formed from Example 7C indicate: moderate rusting of a sample exposed five days in a humidity cabinet, signs of failure after three days in a salt spray cabinet and a change in gloss after 32 hours at 38° C. in a Cleveland Condensing Cabinet as follows:
Initial (20°/60°/80°) gloss: 54/77/88
Final (20°/60°/80°) gloss: 21/60/72

EXAMPLE 8—An Internally Plasticized Polymer Emulsion Based on Vinyl Acetate

A latex, with first stage, second stage and average Tg values of 25, 100 and 58 degrees Celcius respectively and Ip values of 17.5 and 12.1 for the first and second stages respectively, is prepared as follows:

A. Equipment

A five liter, five-necked flask is equipped with a condensor, an efficient agitator, a thermometer, addition funnels and heating, cooling and nitrogen sparging facilities.

B. Material Charges

| Raw Material | Monomer Charge 1 | 1A | 2 | Kettle Charge |
|---|---|---|---|---|
| deionized water | 166.3g | | 154 g | 883.7g |
| octylphenoxy poly (39) ethoxyethanol Abex 18S (33%) | 3.4 | | 5.1 | 1.7 |
| (TM Alcolac Inc) sodium dodecylbenzene sulfonate (23%) | 8.5 6.8 | | 12.8 10.2 | 4.3 3.4 |
| ethyl acrylate | 37.8 | | 19.1 | — |
| vinyl acetate | 298.5 | | — | 150.8 |
| styrene | — | | 517.5 | — |
| maleic anhydride | 4.1 | | — | — |
| acrylic acid | — | 7.2 | — | — |
| Initiator: | Fe++ (0.15% FeSO₄ . 6H₂O) 6.4 ml 0.26g ammonium persulfate (APS) in 8g water. 0.26g sodium sulfoxylate formaldehyde in 8g water. | | | |
| Catalyst: | 1.92g APS and 0.32g t-butyl hydroperoxide (tBHP) in 110g water. | | | |
| Activator: | 1.92g NaHSO₃ in 110g water. | | | |
| Chaser: | 0.52g tBHP in 5g water. 0.39g sodium sulfoxylate formaldehyde in 5g water. | | | |

C. Procedure

The monomer charges and kettle charges are weighed separately and each is mixed to form an emulsion. The initiator mix is prepared and charged to the kettle. Efficient kettle stirring is maintained throughout the entire reaction sequence. The heat of reaction drives the kettle temperature from 22° C. to a maximum (ca 60° C. in ca. 7 min.). At the temperature maximum, monomer charge 1 addition is begun at a rate of 13 ml/min and addition of the catalyst solution and activator solution is begun as separate feed streams at a rate of 1 ml/min. The reaction temperature is maintained at ca. 62° C. throughout. When one half of the monomer charge 1 addition is completed (ca. 22 min) charge 1A is mixed with the remaining monomers of charge 1 and the addition continued. After about 45 minutes this monomer charge (1+1A) addition is completed and the kettle contents are maintained at 62° C. for 15 minutes. Monomer charge 2 addition is then begun at a rate of 13 ml/min. This second addition is completed in about one hour and the kettle contents are maintained at 62° C. for 10 minutes while the catalyst and activator charges are completed. The reaction mixture is held at 62° for an additional 15 minutes and then allowed to cool to 55° C. The chaser is now charged rapidly, and the reaction mixture maintained at 50°-60° C. for 15 minutes. The product is allowed to cool to room temperature and is packaged.

A sample of the product latex is neutralized to a pH of 8.5 with ammonia and is found to have a viscosity of 40 centipoises (20% solids Brookfield Synchro-Lectric Viscometer Model LV1 spindle 1 at 60 rpm) and a MFT below 15° C. A film cast from this sample has a hardness of 17 KHN.

EXAMPLE 9—An Internally Plasticized Polymer Emulsion Having an Acid-Containing Last Stage A latex, with first stage, second stage and average Tg values of 28, 112 and 65 degrees Celcius respectively and Ip values of 17.5 and 14.5 for the first and second stages respectively, is prepared using the same equipment as Example 8 and a similar procedure as follows:

Material Charges

| Raw Material | Monomer Charge 1 | 1A | 2 | Kettle Charge |
|---|---|---|---|---|
| deionized water | 154.0 g. | 64 g. | 154.0 g. | 832 g. |
| octylphenoxy poly(39)ethoxyethanol Abex 26S (33%) (TM Alcolac Inc) | 5.1 | | 5.1 | — |
| sodium dodecylbenzene sulfonate (23%) | 12.8 | | 12.8 | — |
| ethyl acrylate | 10.3 | | 10.3 | — |
| vinyl acetate | 56.9 | | — | — |
| styrene | 449.3 | | — | — |
| methacrylic acid | — | 7.2 | 440.0 | — |
| maleic anhydride | — | 4.1 | 77.6 | — |
| Initiator: | Fe$^{++}$ (0.15% FeSO$_4$ . 6H$_2$O) 6.4 ml<br>0.26g ammonium persulfate (APS) in 8g water.<br>0.26g sodium sulfoxylate formaldehyde in 8g water. | | | |
| Catalyst: | 1.92g APS and 0.32g t-butyl hydroperoxide (tBHP) in 110g water. | | | |
| Activator: | 1.92g NaHSO$_3$ in 110g water. | | | |
| Chaser: | 0.52g tBHP in 5g water.<br>0.39g sodium sulfoxylate formaldehyde in 5g water. | | | |

Procedure

1. Charge kettle and adjust temperature to 20°–22° C.; sparge with N$_2$.
2. Prepare charge 1 and add 231 g. to kettle.
3. Add maleic anhydride in water and methacrylic acid (charge 1A) to remainder of monomer charge 1 and emulsify.
4. Add initiator; turn off N$_2$ sparge.
5. Within several minutes of initiator addition, an exothermic reaction occurs, with the temperature peaking at 55°–60° C.
6. At the peak, start addition of monomer charge 1 and half of the catalyst and activator. Allow temperature to rise to 62° C. and hold at 62° C. throughout addition.
7. Charge 1 addition takes 40–45 minutes; when charge 1 and half of the catalyst and activator have been added, hold system at 62° for 20 minutes.
8. After 20 minutes, start addition of charge 2 and of catalyst and activator.
9. Addition of charge 2 takes about 55 minutes; addition of catalyst and activator takes an additional 10 minutes.
10. Hold for 30 minutes at 62° C.
11. After hold period, cool to 55° then add chaser and hold for 10 minutes before cooling to room temperature.
12. At room temperature, adjust pH to 4.5–5.0 with 10% NH$_4$HCO$_3$ aqueous solution.

A sample of the product latex has a viscosity of 19 centipoise (20% solids Brookfield Synchro-Lectric Viscometer Model LV1 spindle 1 at 60 rpm) and a MFT of 37° C. A film cast from this sample has a hardness of 14 KHN; when 1% Zn$^{++}$ (as ZN(NH$_3$)$_4$(HCO$_3$)$_2$) on polymer solids is admixed, as taught in U.S. Pat. No. 3,328,325, the hardness of a film is 15.5 KHN.

EXAMPLE 10—Effect of Hydrophilic Monomer Level

Following the procedure of Example 9, a group of polymer emulsions are prepared having the compositions and properties given in Table VII. From these emulsions floor polishes are prepared by mixing ingredients in the following recipe:

| Role | Material | Charge |
|---|---|---|
| Vehicle | Polymer emulsion-15% solids | 90.0 parts |
| Wax | AC 392-15% solids (Trademark, Allied Chem. Corp.) | 10.0 parts |
| Wetting aid | Fluorad FC128-1% solids (Trademark, 3M Co.) | 0.5 parts |
| Leveling aid | Tributoxyethyl phosphate-100% active | 0.5 parts |
| Coalescent | Methyl carbitol | 4.0 |
| Base | Ammonia-10% aqueous | to pH 7.5 |

Each floor polish is applied and tested by the procedure described in Example 6. The results are in Table VII where the superior polish properties of 10D and 10E are noted.

The AC-392 is prepared at 35% solids, as follows, and is diluted to 15% solids with water.

| Formulation | Parts by Weight |
|---|---|
| A-C Polyethylene 392 | 40 |
| Octylphenoxy poly(9)ethoxyethanol | 10 |
| KOH (90% Flake) | 1.2 |
| Sodium Meta Bisulfite | 0.4 |
| Water #1 to 50% Solids | 50 |
| Water #2 to 35% Solids | 43 |

Charge the first five ingredients to produce the 50% concentrate into a stirred pressure reactor. Begin agitation and heat to 95° C. (203° F.) with the vent open. Close the vent and continue heating to 150° C. (302° F.) for ½ hour. Add water #2 (43 parts) at 95° C. (203° F.) to the reactor while the temperature is at 150° C. (302°) and then cool to room temperature with agitation as quickly as possible. Add 500 ppm formaldehyde preservative.

Table VIII

| Example | 10A | 10B | 10c |
|---|---|---|---|
| Polymer emulsion | | | |
| Composition | VAc/VOH//ST | VAc/VOH/MAA//ST | Vac/VOH/MAA//ST |
| Weight ratio | 49.5/0.5//50 | 46.75/2.0/1.25//50 | 45.5/2.5/2.0//50 |
| Tg (1), ° C. | 30 | 33 | 34 |
| Tg (2), ° C. | 100 | 100 | 100 |
| Tg - average, ° C. | 57 | 59 | 60 |
| MFT, ° C. | below 15 | below 15 | below 15 |
| Ip (1) | 16.2 | 16.5 | 16.7 |
| Ip (2) | 12.1 12.1 | 12.1 | |
| Ip(1) - Ip(2) | 4.1 | 4.4 | 4.6 |
| Polish properties | | | |
| Viscosity(cps)/pH | 2.0/8.2 | 3.6/8.0 | 4.5/8.3 |
| Visual gloss | poor | poor | fair |
| Leveling | fair | very good- | very good |

| | Table VIII-continued | | |
|---|---|---|---|
| Visual haze | severe | severe | moderate-severe |

| Example | 10D | 10E |
|---|---|---|
| Polymer emulsion | | |
| Composition | EA/VAc/VOH/MAA//ST | EA/VAc/VOH/MAA//ST |
| Weight ratio | 5/39.1/3.4/2.5//50 | 10/32.2/2.8/5//50 |
| Tg (1), °C. | 31 | 30 |
| Tg (2), °C. | 100 | 100 |
| Tg - average, °C. | 57 | 56 |
| MFT, °C. | below 15 | below 15 |
| Ip (1) | 17.4 | 17.9 |
| Ip (2) | 12.1 | 12.1 |
| Ip(1) - Ip(2) | 5.3 | 5.8 |
| Polish properties | | |
| Viscosity(cps)/pH | 3.5/7.2 | 3.7/7.0 |
| Visual gloss | good | good |
| Leveling | excellent | excellent |
| Visual haze | slight-moderate | slight |

EXAMPLE 11—Effect of Acid Variations

Following the procedure of Example 9, a group of polymer emulsions are prepared having the compositions and properties given in Table VIII. Floor polishes are prepared from these emulsions and are tested as described in Example 10. Results of these tests are in Table VIII wherein it is seen that Example 11A does not have pronounced weaknesses and that the copolymers utilizing maleic anhydride are not hazy.

Table VIII

| Example | 11A | 11B | 11C | 11D |
|---|---|---|---|---|
| Polymer Emulsion | | | | |
| Composition | all expressed as EA/VAc/VOH/MAn/MAA//ST | | | |
| Weight ratio | 5.5/37.8/5.6/0.4/0.7//50 | 5.5/40.3/3.5/0/0.7//50 | 5.5/39.7/4.4/0.4/0//50 | 5.5/42.7/1.8/0/0//50 |
| Tg(1), °C. | 27.7 | 26.4 | 26.2 | 25 |
| Tg(2), °C. | 100 | 100 | 100 | 100 |
| Tg-average, °C. | 60 | 59.2 | 59.1 | 58.3 |
| MFT, °C. | 23 | 24 | 24 | — |
| Ip (1) | 17.5 | 17.0 | 17.1 | 16.5 |
| Ip (2) | 12.1 | 12.1 | 12.1 | 12.1 |
| Ip(1) - Ip(2) | 5.5 | 4.9 | 5.0 | 4.4 |
| viscosity*(cps) | 24 | 18 | 20 | 20 |
| Polish properties | | | | |
| Viscosity(cps)/pH | 3.0/7.5 | 2.8/7.2 | 3.4/7.5 | 3.0/7.2 |
| Visual haze | nil | slight(sl) | nil | sl-mod |
| Leveling | very good(vg) | vg-excellent | vg⁻ | good |
| Visual gloss | good | good-vg | good | fair |
| Detergent resistance | fair-good | vg-excellent | vg-excellent | excellent |
| Removability | fair | poor | poor | poor |

*At 40% solids and a pH of 5.

EXAMPLE 12—First Stage/Last Stage Ratio Variations

Polymer emulsions are prepared, by the procedure of Example 9, having a range of first stage to last stage weight ratios as shown in Table IX. The composition of the first stage of each is EA/VAc/VOH/MAn/MAA = 11/75.6/11.2/0.8/1.4 and has a Tg(1) of 27.7° C. and an Ip(1) of 17.5. The last stage of each is polystyrene having a Tg(2) of 100° C. and an Ip(2) of 12.1. Thus the Ip(1)−Ip(2) value of each latex polymer is 5.4. Floor polishes are prepared from these emulsions and tested as described in Examples 6 and 10; test results are in Table IX.

Table IX

| Example | 12A | 12B | 12C | 12D | 12E |
|---|---|---|---|---|---|
| Polymer emulsion | | | | | |
| First//last stage (by weight) | 70//30 | 60//40 | 50//50 | 40//60 | 30//70 |
| MFT °C. | 19° | 21 | 23 | 24 | 80 |
| viscosity*(cps) | 22 | 21 | 24 | 20 | 17 |
| Tg-average °C. | 46.3 | 53.0 | 60.0 | 67.3 | 75.0 |
| Polish properties | | | | | |
| Visual haze | nil | nil | nil | slight | moderate |
| Visual gloss | good | good+ | good | good | fair-gd |
| Leveling | vg | vg+ | vg | vg | vg |
| Detergent resistance | fair | fair | fair | good | vg |
| Removability | fair | fair | fair | poor | poor |
| Heel mark | good | good | good | good | good |
| Overall wear resistance | good | good | good+ | good | good |

*At 40% solids and a pH of 5.

EXAMPLE 13—Maleic Anhydride/Methacrylic Acid Levels

Polymer emulsions are prepared, by the procedure of Example 9, with a range of maleic anhydride and methacrylic acid levels in the first stage as shown in Table X. Each last stage is polystyrene and represents 50 weight percent of the polymer. The polymer of Example 13A is the same as that of Example 11A. The compositional differences being comparatively small the Tg values and the Ip values for the other three polymers are but little different from those for Example 13A. Polishes prepared from these emulsions are tested as in Examples 6 and 10 to give the performance results recorded in Table X. A wide range of removability and of detergent resistance is achieved; remarkable in view of the vinyl acetate content of the polymer.

Table X

| Example | 13A | 13B | 13C | 13D |
|---|---|---|---|---|
| Polymer emulsion | | | | |
| Composition | | first stage is EA/VAc/VOH/MAn/MAA | | |
| Weight ratio | 5.5/37.8/5.6/0.4/0.7 | 5.5/37.2/6.0/0.4/0.3 | 5.3/37.0/6.2/0.2/0.7 | 5.5/36.9/6.5/0.8/0.7 |
| MFT, °C. | 23 | 23 | 26 | 24 |
| viscosity*(cps) | 24 | 22 | 18 | 40 |
| Polish properties | | | | |
| Visual haze | nil | nil | nil | nil |
| Visual gloss | good | good | good | fair-good |
| Leveling | very good(vg) | vg | vg | good-vg |
| Detergent resistance | fair-good | vg-excellent | fair-good | poor |
| Removability | fair | poor | fair-good | excellent |

*At 40% solids and a pH of 5.

EXAMPLE 14—Acid in the Last Stage

The polish of Example 14A is prepared from the same polymer latex as that of Example 11A. A film of this polymer is found to have a Knoop Hardness Number of 10. The polish of Example 14B is prepared from the polymer latex of Example 9 and is crosslinked with 1% $Zn^{++}$, on polymer solids, added as $Zn(NH_3)_4(HCO_3)_2$. The polish of Example 14C is prepared from a sample of the polymer latex of Example 6A, Table V. A, Note 1; a film of this polymer has a KHN of 13. These polishes are tested as in Examples 6 and 10; the results are in Table XI. Note the balance of removability and detergent resistance obtained while maintaining a high level of performance in other properties.

Table XI

| Example | 14A | 14B | 14C |
|---|---|---|---|
| Polish properties | | | |
| Leveling | vg-exc. | vg | vg-exc. |
| Visual gloss* | | | |
| one coat | g-vg/g | g-vg/g-vg. | vg/g-vg |
| two coats | vg-exc/vg+ | exc/vg-exc. | vg-exc/exc. |
| Visual haze | nil | nil | nil |
| Detergent resistance | fair | vg | vg-exc. |
| Removability | good | vg-exc. | exc. |

*Recorded as results on vinyl tile/on OTVA tile see Test Method 3 of Table V. A. Example 6.

We claim:

1. A latex of internally plasticized addition polymer particles, having a calculated Tg above about 20° C., comprising: (A) a first stage polymer comprising at least 10% hydrophilic mer units comprising 0.5 to 90% acid or base units, in the unneutralized or neutralized form, and about 99.5% to 10% nonionic hydrophilic units and (B) a later stage, less hydrophilic, polymer polymerized in the presence of an emulsion of the first stage polymer, wherein the first and later stage polymers are each at least about 20% of the addition polymer, by weight; the latex having (1) a viscosity below about 5,000 centipoises, at 20% solids over the pH range 4 to 10, and (2) a minimum film temperature more than 5° C. below the calculated Tg of the addition polymer.

2. The latex of claim 1 in which the viscosity is below 500 centipoises, the Tg is above 30° C., and a film produced from the latex has a Knoop Hardness Number above 5.

3. The latex of claim 2 in which the hydrophilic mer units comprise about 0.5 to 90% acid units and the viscosity is below 150 centipoises.

4. The latex of claim 2 in which the hydrophilic mer units comprise about 0.5 to 90% base units and the viscosity is below 150 centipoises.

5. The latex of claim 3 in which the viscosity is below 40 centipoises, the minimum film temperature is below 18° C., the Knoop Hardness Number is above 8 and the acid units comprise carboxyl groups.

6. The latex of claim 5 in which the viscosity is below 10 centipoises, and 50 to 90% of the hydrophilic mers are from a hydroxyalkyl ester of an $\alpha,\beta$-unsaturated acid.

7. The latex of claim 6 in which the addition polymer comprises at least one of acrylate, methacrylate, vinyl ester, and vinyl aromatic mer units.

8. The latex of claim 2 in which the first stage polymer comprises 10% to 70% by weight hydrophilic mers and the later stage polymer has a calculated Tg at least 10° C. above the calculated Tg of the first stage polymer; the polymers of the first and later stage polymers each are at least 30% of the addition polymer weight, and the viscosity of the latex is below 150 centipoises.

9. The latex of claim 8 in which the minimum film temperature is below 18° C., the addition polymer has a Knoop Hardness Number above 5, the calculated Tg of the first stage polymer is below 40° C., and the later stage polymer is harder than the first stage polymer.

10. The latex of claim 9 in which the viscosity is below 40 centipoises, the Knoop Hardness Number above 8, the Tg of the first stage polymer is below 5° C., and the Tg of the later stage polymer is above 75° C.

11. The latex of claim 10 in which the vicosity is below 10 centipoises, the polymers of the first and later stages each are at least 40% of the addition polymer, by weight, the Tg of the first stage polymer is below $-10°$ C. and the Tg of the last stage polymer is about 100° C. or higher.

12. The latex of claim 11 in which the hydrophilic mers comprise at least 0.5% carboxylic acids and at least 10% nonionic mers.

13. The latex of claim 12 in which the addition polymer is a polymer of monomers comprising at least one of acrylates, methacrylates, vinyl esters and vinyl aromatics.

14. The latex of claim 13 in which the monomers of the first stage comprise 65 to 85% $C_1$–$C_4$ alkyl acrylate, $C_1$–$C_4$ alkyl methacrylate, styrene or a mixture thereof; 5 to 10% acrylic acid, methacrylic acid, itaconic acid or a mixture thereof; and 10 to 25% hydroxy $C_1$–$C_4$ alkyl methacrylate, hydroxy $C_1$–$C_4$ alkyl acrylate or a mixture thereof, by weight, and the monomers of the later stage polymer consist essentially of methyl methacrylate, styrene or a mixture thereof.

15. The latex of claim 13 in which the mer units of the first stage comprise 50 to 85% vinyl acetate; 1 to 10% acrylic, methacrylic, itaconic or maleic acids or a mixture thereof; and 8 to 25% vinyl alcohol, by weight; and the mer units of the later stage consist essentially of methyl methacrylate or styrene mers or a mixture thereof and 0 to 30%, by weight, acidic mers.

16. The latex of claim 15 in which the mer units of the first stage comprise 1 to 4% acid mer units, comprising 0.2 to 2% maleic acid units, 0 to 20% $C_1$-$C_4$ alkyl acrylates, 65-80% vinyl acetate and 10 to 20% vinyl alcohol, by weight; and the mer units of the later stage comprise 10 to 20% acid units, by weight.

17. A latex of internally plasticized addition polymer particles comprising:
   (A) a first stage polymer, polymerized from a monomer mix consisting essentially of monoethylenically unsaturated monomers, comprising, by weight, at least 10% hydrophilic mers, the hydrophilic mers comprising at least 10% nonionic and at least 0.5% ionic mers, and
   (B) a less hydrophilic, higher Tg, later stage polymer polymerized in the presence of an emulsion of the first stage polymer;
   (A) being from 20% to 80% of the combined weight of (A) and (B); the interpenetration parameter of (A) being greater than that of (B) by up to eight units.

18. The addition polymer of claim 17 polymerized from monomers comprising at least one of acrylate esters, methacrylate esters, esters of vinyl alcohol and monoethylenically unsaturated aromatic hydrocarbons.

19. The addition polymer of claim 18 being an aqueous emulsion polymerized polymer with (A) being from 30 to 70% of the combined weight of (A) and (B) and the interpenetration parameter of (A) being greater than that of (B) by 1 to 6 units.

20. The addition polymer of claim 19 in which the hydrophilic nonionic mers comprise hydroxyalkyl esters of carboxylic acids.

21. The addition polymer of claim 20 in which the hydrophilic ionic mers comprise a carboxylic acid group.

22. The addition polymer of claim 19 in which the hydrophilic nonionic mers comprise vinyl alcohol mer units.

23. In an aqueous composition adapted to be used for polishing flooring, furniture, and the like, said composition being capable of forming a coating film having a Knoop Hardness Number of at least 0.5 and containing:
   (a) 10 to 100 parts by weight of a water-insoluble addition polymer obtained by the emulsion polymerization of at least one ethylenically unsaturated monomer,
   (b) 0 to 90 parts by weight of an alkali-soluble resin also being up to 90% by weight, based on the weight of (a),
   (c) 0 to 90 parts by weight of a wax,
   (d) wetting, emulsifying and dispersing agents in an amount of 0.5 to 20% by weight of the sum of (a), (b) and (c),
   (e) at least one polyvalent metal compound in an amount of about 0 to 50% by weight of (a),
   (f) water to make total solids 0.5 to 45%, the improvement wherein said water-insoluble addition polymer is the internally plasticized addition polymer of claim 1.

24. A process of polishing a hard surface comprising the steps of coating the surface with the composition of claim 23 and drying the coating.

25. The polished hard surface prepared by the process of claim 24.

26. A process, for producing a latex of internally plasticized addition polymer particles, comprising:
   (a) polymerizing a first stage polymer comprising at least 10% hydrophilic mer units comprising nonionic hydrophilic units and
   (b) in the presence of an emulsion of the first stage polymer polymerizing a later stage less hydrophilic polymer wherein the first and later stage polymers are each at least about 20% of the addition polymer, by weight, to produce a latex having (1) a viscosity below about 5,000 centipoises at 20% solids and over the pH range 4 to 10, and (2) a minimum film temperature more than 5° C. below the calculated Tg of the addition polymer;
   the addition polymer having a calculated Tg above about 20° C.

27. A process, for producing a latex of internally plasticized addition polymer particles, comprising
   (a) producing a first stage polymer, polymerized from a monomer mix consisting essentially of monoethylenically unsaturated monomers, comprising at least 10% by weight hydrophilic mers, the hydrophilic mers comprising at least 10% by weight nonionic mers and at least 0.5% by weight ionic mers and
   (b) polymerizing, in the presence of an emulsion of the first stage polymer, a later stage polymer less hydrophilic, having an interpenetration parameter higher by up to eight units, and a higher Tg than the first stage polymer, the first stage polymer being from 20 to 80% by weight of the total first and later stage polymers.

28. The process of claim 27 in which the latex has a viscosity below 40 centipoises at 20% solids over the pH range 4 to 10 and a minimum filming temperature more than 5° C. below the Tg calculated for the addition polymer; and in which the monomers of the first stage consist essentially of 65 to 85 $C_1$-$C_4$ alkyl acrylate, $C_1$-$C_4$ alkyl methacrylate, styrene or a mixture thereof; 5 to 10% acrylic acid, methacrylic acid, itaconic acid or a mixture thereof; and 10 to 25% hydroxy $C_1$-$C_4$ alkyl methacrylate, hydroxy $C_1$-$C_4$ alkyl acrylate or a mixture thereof, by weight, and the monomers of the last stage consist essentially of methyl methacrylate, styrene or a mixture thereof; the interpenetration parameter of the first stage being 1 to 4 units higher than that of the later stage.

29. The process of claim 27 in which the latex has a viscosity below 40 centipoises at 20% solids over the pH range 4 to 10 and a minimum film temperature more than 5° C. below the Tg calculated for the addition polymer; and in which the mer units of the first stage polymer comprise by weight 65 to 85% vinyl acetate, 5 to 10% acrylic acid, methacrylic acid, itaconic acid or a mixture thereof, 8 to 25% vinyl alcohol and the mer units of the last stage polymer consist essentially of methyl methacrylate or styrene mers, or a mixture thereof, and 0 to 30%, by weight, acrylic, methacrylic or itaconic acid mers, or a mixture thereof; the interpenetration parameter of the first stage being 2 to 6 units higher than that of the later stage.

* * * * *

UNITED STATES PATENT AND TRADEMARK OFFICE
CERTIFICATE OF CORRECTION

PATENT NO. : 4,150,005

DATED : April 17, 1979

INVENTOR(S) : D. R. Gehman, J. M. Owens and R. E. Zdanowski

It is certified that error appears in the above-identified patent and that said Letters Patent are hereby corrected as shown below:

In Column 18, Table IV.B change "$^2$MFT, 14" to -- -14 --.

In Column 19, Footnote 2 change "Example $^3$Hardness (pH3 as above" to -- Example 5H (pH3 as above) --.

In Column 23, line 9 change "117-8" to -- //7-8 --.

In Column 23, line 9 change "1/2, 1/4, 150 inch blends)" to -- (1/2, 1/4, 1/8 inch blends) --.

In Column 24, line 7 " — " should be under Column 2.

In Column 24, line 7 "19.1" should be under "Kettle Charge" not under "2".

In Column 26, "Table VIII" should be changed to -- Table VII --.

In Column 26, Table VIII (sic), in the heading, "10c" should read -- 10C --.

In Table VIII (sic) (10th line of the table), Ip(2) should read "12.1" in each of the three columns.

UNITED STATES PATENT AND TRADEMARK OFFICE
CERTIFICATE OF CORRECTION

PATENT NO. : 4,150,005
DATED : April 17, 1979
INVENTOR(S) : D. R. Gehman, J. M. Owens and R. E. Zdanowski It is certified that error appears in the above-identified patent and that said Letters Patent are hereby corrected as shown below:

In Column 27, line 1 change "Table VIII-continued" to -- Table VII-continued --.

Signed and Sealed this

Seventeenth Day of March 1981

[SEAL]

Attest:

RENE D. TEGTMEYER

Attesting Officer

Acting Commissioner of Patents and Trademarks